United States Patent [19]

Wu et al.

[11] Patent Number: 6,093,671
[45] Date of Patent: Jul. 25, 2000

[54] CARBIDED HYDROCARBON CONVERSION CATALYST COMPOSITION AND PROCESSES THEREFOR AND THEREWITH

[75] Inventors: An-hsiang Wu, Bartlesville; Charles A. Drake, Nowata, both of Okla.

[73] Assignee: Phillips Petroleum Company, Bartlesville, Okla.

[21] Appl. No.: 09/126,342

[22] Filed: Jul. 30, 1998

[51] Int. Cl.$^7$ ..................................................... B01J 29/04
[52] U.S. Cl. .............................. 502/60; 502/7.1; 502/77; 502/84; 208/136
[58] Field of Search .................................. 502/60, 71, 77, 502/84; 208/136

[56] References Cited

U.S. PATENT DOCUMENTS

| | | | |
|---|---|---|---|
| 3,671,602 | 6/1972 | Inoue et al. | 260/672 T |
| 3,860,533 | 1/1975 | Young | 252/455 Z |
| 3,928,233 | 12/1975 | Young | 252/455 Z |
| 3,992,468 | 11/1976 | Cosyns et al. | 260/672 R |
| 4,045,505 | 8/1977 | Ireland et al. | 260/673 |
| 4,213,847 | 7/1980 | Chen et al. | 208/111 |
| 4,284,529 | 8/1981 | Shihabi | 252/455 Z |
| 4,670,614 | 6/1987 | Ushio et al. | 585/417 |
| 4,738,940 | 4/1988 | Dufresne et al. | 502/66 |
| 4,738,941 | 4/1988 | Defresne et al. | 502/66 |
| 4,784,750 | 11/1988 | Dufresne et al. | 208/120 |
| 5,143,596 | 9/1992 | Maxwell et al. | 208/89 |
| 5,384,297 | 1/1995 | Prada et al. | 502/66 |
| 5,430,000 | 7/1995 | Timken | 502/60 |
| 5,506,182 | 4/1996 | Yamagishi et al. | 502/66 |
| 5,689,027 | 11/1997 | Abichandani et al. | 585/481 |
| 5,776,852 | 7/1998 | Wu et al. | 502/177 |
| 5,804,059 | 9/1998 | Wu et al. | 208/135 |
| 5,866,741 | 2/1999 | Wu et al. | 585/475 |
| 5,866,744 | 2/1999 | Wu et al. | 585/486 |

*Primary Examiner*—Tom Dunn
*Assistant Examiner*—Cam N. Nguyen
*Attorney, Agent, or Firm*—Richmond, Hitchcock, Fish & Dollar

[57] ABSTRACT

A composition, a process for producing the composition, and a hydrotreating process are disclosed. The composition comprises a zeolite having incorporated therein a promoter comprising at least two carburized metals. The composition can be produced by incorporating at least two metal compounds into the zeolite followed by thermal treatment of the resulting zeolite with a hydrocarbon, preferably in a reducing atmosphere. The hydrotreating process comprises contacting a hydrocarbon-containing fluid with the composition under a condition sufficient to effect the reduction of sulfur content in the hydrocarbon-containing fluid.

28 Claims, No Drawings

6,093,671

CARBIDED HYDROCARBON CONVERSION CATALYST COMPOSITION AND PROCESSES THEREFOR AND THEREWITH

FIELD OF THE INVENTION

This invention relates to a catalyst composition useful in hydrotreating hydrocarbons, to a process for producing the composition, and to a process for using the composition in a hydrotreating process.

BACKGROUND OF THE INVENTION

In a hydrotreating process for treating a hydrocarbon stream, such as coker naphtha or catalytically cracked gasoline, the content of sulfur impurities is generally reduced thereby producing a product that can be commercially used. However, most commercial hydrotreating processes, while they reduce sulfur content, also reduce the octane number of the hydrocarbon. Therefore, a second process is generally required to increase the octane number of the sulfur-reduced hydrocarbon product. Such a multi-step process greatly increases the cost of the final products.

Accordingly, there is an ever-increasing need to develop a catalyst and a single process to simultaneously reduce sulfur content and to retain or even increase the octane number of a hydrocarbon. Such a development would also be a significant contribution to the art and to the economy.

SUMMARY OF THE INVENTION

An object of this invention is to provide a catalyst composition which can be used in a hydrotreating process. Also an object of this invention is to provide a process for producing the catalyst composition. Another object of this invention is to provide a process which can employ the catalyst composition in a hydrotreating process. An advantage of the catalyst composition is that it can in a single hydrotreating process simultaneously reduce the sulfur content in a hydrocarbon and substantially retain the octane number of the hydrocarbon. Other objects and advantages will become more apparent as the invention is more fully disclosed hereinbelow.

According to a first embodiment of the present invention, a composition which can be used as a catalyst in a hydrotreating process or for upgrading a hydrocarbon is provided. The composition can comprise a carbon-modified zeolite having incorporated therein a promoter comprising at least one carburized metal.

According to a second embodiment of the invention, a process for producing a composition which can be used as catalyst in a hydrocarbon upgrading or a hydrotreating process is provided. The process can comprise (1) optionally calcining a zeolite to produce a calcined zeolite; (2) optionally contacting a zeolite or a calcined zeolite with an acid to produce an acid-leached zeolite; (3) contacting a zeolite, a calcined zeolite, or an acid-leached zeolite with a transition metal compound of Groups IB to VIII of the CAS version of the Periodic Table of the Elements (CRC Handbook of Chemistry and Physics, 74th edition, 1993–1994, CRC Press, Boca Raton, Fla.) under a condition sufficient to incorporate the metal compound into the zeolite to form a modified zeolite; and (4) contacting the modified zeolite with a hydrocarbon to produce a carbon-modified zeolite.

According to a third embodiment of the present invention, a process which can be used in a hydrotreating process is provided which comprises, consists essentially of, or consists of, contacting a fluid which comprises at least one saturated hydrocarbon and a sulfur compound, optionally in the presence of an inert fluid such as a hydrogen-containing fluid, with a catalyst composition, which can be the same as disclosed above in the first embodiment of the invention, under a condition effective to reduce the sulfur content in the hydrocarbon in the fluid and to substantially retain the octane number of the hydrocarbon in the fluid.

DETAILED DESCRIPTION OF THE INVENTION

According to the first embodiment of the invention, a composition which can be used as a catalyst in a hydrotreating process is provided. The composition comprises, consists essentially of, or consists of, a zeolite having incorporated therein a promoter which comprises, consists essentially of, or consists of at least one carburized metal. The metal is selected from the transition metals of Groups IB–VIII of the Periodic Table of the Elements such as, for example, La, Ti, Cr, Mn, Fe, Co, Ni, Mo, Pd, Rh, Ru, Zr, Hf, W, Re, Ir, Pt, Zn, Ag, Cu, Ce, V, Nb, and combinations of two or more thereof wherein the promoter is present in the composition in a sulfur-reducing amount to reduce the sulfur content in a hydrocarbon, when the composition is used in a hydrotreating process.

As used herein, the term "hydrocarbon" generally refers to, unless otherwise indicated, one or more hydrocarbons, saturated or unsaturated, having 1 to about 50, preferably about 2 to about 40, more preferably about 2 to about 30, and most preferably 2 to 20 carbon atoms per molecule. Also preferably a hydrocarbon comprises at least one saturated hydrocarbon, or a mixture of saturated hydrocarbons and unsaturated hydrocarbons. Examples of such hydrocarbons include, but are not limited to, ethane, propanes, butanes, pentanes, hexanes, gasolines, naphthas, fuel oils, and combinations of two or more thereof.

The term "carbon-modified zeolite", "carburized zeolite", or "carburized metal" refers to, unless otherwise indicated, a zeolite or metal that has been treated with a hydrocarbon under a condition sufficient to modify the zeolite or metal with the carbon. Carburized metal can be a metal carbide.

The term "substantial" or "substantially" signifies that which is more than trivial.

The term "hydrotreating" denotes a refinery process to remove sulfur and nitrogen from a hydrocarbon such as crude oils, naphthas, and catalytically cracked gasolines.

The term "metal" used herein refers to, unless otherwise indicated, both "metal" and "element" of the Periodic Table of the Elements because some elements in the Periodic Table of the Elements may not be considered as metals by those skilled in the art. The term "metal" also refers to a metal compound such as, for example, metal oxide.

According to the first embodiment of the invention, the weight ratio of the promoter to the zeolite can be any ratio so long as the ratio can effect the reduction of sulfur content in the hydrocarbon in a hydrotreating process. Generally, the ratio can be in the range of from about 0.0001:1 to about 1:1, preferably about 0.0005:1 to about 1:1, more preferably about 0.001:1 to about 0.9:1 and most preferably from 0.005:1 to 0.75:1 for an effective reduction of sulfur content. Alternatively, the promoter can be present in the catalyst composition in the range of from about 0.01 to about 50, preferably about 0.05 to about 50, more preferably about 0.1 to about 45, and most preferably 0.5 to 40 grams per 100 grams of the catalyst composition.

The weight ratio of carbon to the metal of the carburized metal can be in the range of about 0.001:1 to about 1:1, preferably about 0.005:1 to about 1:1, more preferably about 0.01:1 to about 1:1, and most preferably 0.01:1 to 0.5:1. The presently preferred composition is a ZSM-5 zeolite having incorporated therein at least two carburized metals.

According to the present invention, any promoter that, as compared to use of a zeolite only, can effect the reduction of sulfur content, nitrogen content, or both, or can substantially retain the octane number of a hydrocarbon in a hydrotreating process can be employed. Presently the preferred suitable metals can be selected from the group consisting of molybdenum, manganese, iron, chromium, hafnium, ruthenium, tungsten, cobalt, rhenium, rhodium, iridium, nickel, palladium, platinum, silver, copper, zinc, lanthanum, titanium, and combinations of two or more thereof. The metal can be in any available oxidation state. For example, molybdenum can have an oxidation state of 0, 2, 3, 4, 5, and 6.

Any commercially available zeolites can be employed in the invention. Examples of suitable zeolites include, but are not limited to, those disclosed in Kirk-Othmer Encyclopedia of Chemical Technology, third edition, volume 15 (John Wiley & Sons, New York, 1991). The presently preferred zeolite is a ZSM-5 zeolite.

The presently most preferred composition comprises carburized molybdenum, carburized nickel, optionally carburized titanium, and ZSM-5; or carbon, molybdenum, nickel, optionally carburized titanium, and ZSM-5 zeolite in which carburized molybdenum is present in the composition in the range of about 3 to 15 weight %, carburized nickel is present in the composition in the range of about 0.5 to about 10 weight %, optionally carburized titanium is present in the composition in the range of about 0.5 to about 10 weight % and the remainder can be the zeolite or the zeolite and a binder as disclosed hereinbelow.

Any methods known to one skilled in the art for incorporating a compound or a portion thereof into a zeolite such as, for example, impregnation, ion exchange, stirring, extrusion, or any physical mixing, can be employed for producing the composition of the present invention. However, it is presently preferred that the composition be produced by the process disclosed in the second embodiment of the invention.

According to the second embodiment of the invention, a zeolite, preferably a ZSM-5, can be optionally contacted with one or more suitable binders in a liquid, preferably aqueous medium, to form a zeolite-binder mixture. Any binders known to one skilled in the art for use with a zeolite are suitable for use herein. Examples of suitable binders include, but are not limited to, clays such as for example, kaolinite, halloysite, vermiculite, chlorite, attapulgite, smectite, montmorillonite, illite, saconite, sepiolite, palygorskite, and combinations of two or more thereof; diatomaceous earth; aluminas such as for example α-alumina and γ-alumina; silicas; alumina-silica; aluminum phosphate; aluminum chlorohydrate; and combinations of two or more thereof. Because these binders are well known to one skilled in the art, description of which is omitted herein. The weight ratio of a zeolite to a binder can be in a wide range and generally in the range of from about 200:1 to about 0.01:1, preferably 100:1 to 0.1:1.

The zeolite and the binder can be well mixed by any means known to one skilled in the art such as stirring, blending, kneading, or extrusion, following which the zeolite-binder mixture can be dried in air at a temperature in the range of from about 20 to about 200° C., preferably about 25 to about 175° C., and most preferably 25 to 150° C. for about 0.5 to about 50 hours, preferably about 1 to about 30 hours, and most preferably 1 to 20 hours, preferably under atmospheric pressure. Thereafter, the dried, zeolite-binder mixture can be further calcined, if desired, in air at a temperature in the range of from about 300 to 1000° C., preferably about 350 to about 750° C., and most preferably 450 to 650° C. for about 1 to about 30 hours to prepare a calcined zeolite-binder. If a binder is not desired, a zeolite can also be calcined under similar conditions to remove any contaminants, if present.

According to the second embodiment of the invention, a zeolite in a desired ionic form, regardless whether calcined or containing a binder, can be optionally contacted with steam under a condition sufficient to effect the formation of steamed zeolite. Generally the steam temperature can be in the range of from about 120° C. to about 1500° C., preferably about 200° C. to about 1000° C., more preferably 250° C. to 800° C., and most preferably 350° C. to 625° C. The contact period can be as short as 5 minutes to as long as about 30 hours, preferably about 30 minutes to 20 hours, and most preferably 1 hour to 10 hours. The treatment can be carried out under a pressure that can maintain or accommodate the steam temperature in the range of from about atmospheric pressure to about 2,000, preferably to about 1,500, and most preferably to 1000 psig.

According to the second embodiment of the invention a zeolite, whether it has been steamed or not, also can be treated with an acid. Generally, any organic acids, inorganic acids, or combinations of any two or more thereof can be used in the process of the present invention so long as the acid can reduce the aluminum content in the zeolite. The acid can also be a diluted aqueous acid solution. Examples of suitable acids include, but are not limited to, citric acid, oxalic acid, propionic acid, succinic acid, malic acid, sulfuric acid, hydrochloric acid, nitric acid, phosphoric acid, formic acid, acetic acid, trifluoroacetic acid, trichloroacetic acid, p-toluenesulfonic acid, methanesulfonic acid, partially or fully neutralized acids wherein one or more protons have been replaced with, for example, a metal (preferably an alkali metal) or ammonium ion, and combinations of any two or more thereof. Examples of partially or fully neutralized acids include, but are not limited to, sodium bisulfate, sodium dihydrogen phosphate, potassium hydrogen tartarate, ammonium sulfate, ammonium chloride, ammonium nitrate, and combinations thereof. The presently preferred acids are hydrochloric acid and nitric acid for they are readily available.

Any methods known to one skilled in the art for treating a solid catalyst with an acid can be used in the acid treatment of the present invention. Generally, a zeolite material can be suspended in an acid solution. The concentration of the zeolite in the acid solution can be in the range of from about 0.01 to about 500, preferably about 0.1 to about 400, more preferably about 1 to about 350, and most preferably 5 to 300 grams per liter. The amount of acid required is the amount that can maintain the solution in acidic pH during the treatment. Preferably the initial pH of the acid solution containing a zeolite is adjusted to lower than about 7, preferably lower than about 6, and most preferably lower than 5. Upon the pH adjustment of the solution, the solution can be subjected to a treatment at a temperature in the range of from about 30° C. to about 200° C., preferably about 50° C. to about 150° C., and most preferably 70° C. to 120° C. for about 10 minutes to about 30 hours, preferably about 20 minutes to about 25 hours, and most preferably 30 minutes to 20 hours. The treatment can be carried out under a pressure in the range of from about 1 to about 10 atmospheres (atm), preferably about 1 atm so long as the desired temperature can be maintained. Thereafter, the acid-treated zeolite material can be washed with running water for 1 to about 60 minutes followed by drying, at about 50 to about 1000, preferably about 75 to about 750, and most preferably 100 to 650° C. for about 0.5 to about 15, preferably about 1 to about 12, and most preferably 1 to 10 hours, to produce an acid-leached zeolite. Any drying method known to one skilled in the art such as, for example, air drying, heat drying, spray drying, fluidized bed drying, or combinations of two or more thereof can be used.

The dried, acid-leached zeolite can also be further washed, if desired, with a mild acid solution such as, for example, ammonium nitrate which is capable of maintaining the pH of the wash solution in acidic range. The volume of the acid generally can be the same volume as the acid for reducing the alumina content in a zeolite. The mild acid treatment can be carried out under substantially the same conditions disclosed in the acid treatment for reducing alumina content in a zeolite. Thereafter, the resulting solid can be washed and dried as disclosed above.

The dried, acid-leached zeolite, whether it has been further washed with a mild acid or not, can be calcined, if desired, under a condition known to those skilled in the art. Generally such a condition can include a temperature in the range of from about 250 to about 1,000, preferably about 350 to about 750, and most preferably 450 to 650° C. and a pressure in the range of from about 0.5 to about 50, preferably about 0.5 to about 30, and most preferably 0.5 to 10 atmospheres (atm) for about 1 to about 30 hours, preferably about 2 to about 20 hours, and most preferably 3 to 15 hours.

Thereafter, a zeolite is generally treated with a metal compound. According to the second embodiment of the present invention, any metal compound, preferably a transition metal compound, that, as compared to use of a zeolite only, can effect the substantial retention of octane number of a hydrocarbon and substantial reduction of the sulfur content, nitrogen content, or both in the hydrocarbon during a hydrotreating process of the hydrocarbon can be employed. Presently it is preferred that a metal compound be selected from the group consisting of molybdenum compounds, titanium compounds, zirconium compounds, lanthanum compounds, tungsten compounds, chromium compounds, iron compounds, ruthenium compounds, manganese compounds, rhenium compounds, cobalt compounds, rhodium compounds, iridium compounds, nickel compounds, palladium compounds, platinum compounds, hafnium compounds, silver compounds, copper compounds, zinc compounds, and combinations of two or more thereof. The presently preferred metal compound is selected from molybdenum compounds, titanium compounds, nickel compounds, tungsten compounds, and combinations of two or more thereof.

Generally, any molybdenum compounds which, when incorporated into a zeolite, are effective to reduce sulfur content can be used in the present invention. Suitable molybdenum compounds include, but are not limited to, molybdenum chloride, molybdenum acetate, molybdenum fluoride, molybdenum hexacarbonyl, molybdenum sulfide, sodium molybdates, potassium molybdates, molybdenum oxychloride, molybdenum sulfide, ammonium tetrathiomolybdate, ammonium molybdate, ammonium dimolybdate, ammonium heptamolybdate, and combinations of two or more thereof.

Examples of suitable nickel compounds include, but are not limited to, nickel acetate, nickel acetylacetonate, nickel perchlorate, nickel phosphide, nickel phosphate, nickel sulfate, nickel sulfide, nickel nitrate, nickel titanate, and combinations of two or more thereof.

Examples of suitable cobalt compounds include, but are not limited to, cobalt acetate, cobalt acetylacetonate, cobalt benzoylacetonate, cobalt chloride, cobalt bromide, cobalt iodide, cobalt carbonate, cobalt fluoride, cobalt 2-ethylhexanoate, cobalt 2,3-naphthalocyanine, cobalt nitrate, cobalt sulfate, cobalt phosphate, cobalt tungstate, cobalt perchlorate, cobalt oxalate, cobalt citrate, cobalt thiocyanate, and combinations of two or more thereof.

Examples of suitable tungsten compounds include, but are not limited to, ammonium tungstate, tungsten chloride, tungsten oxide, tungstic acid, and combinations of two or more thereof.

Examples of suitable zinc compounds include, but are not limited to, zinc formate, zinc acetate, zinc bromide, zinc chloride, zinc fluoride, zinc nitrate, zinc sulfate, zinc molybdate, and combinations of two or more thereof.

Similarly, examples of silver compounds include, but are not limited to, silver nitrate, silver acetate, silver bromide, silver chloride, silver sulfate, silver sulfide, and combinations of two or more thereof.

Examples of suitable titanium compounds include, but are not limited to, titanium isopropoxide; titanium, bis(2,4-pentane-dionate-O,O')bis(2-propanolato)-; ethanol 2,2',2"-nitrilotris-, titanium (4+) salt; titanate (2–), dihydroxy bis [2-hydroxypropanato(2)-$O^1O^2$]-; titanium bis(ethyl-3-oxobutanolate-$O^1,O^3$)bis(2-propanolate)-; titanium, bis(2,4-pentanedionato-O,O')bis(2-propanolate)-; zinc titanate, lanthanum titanate, titanium tetramides, titanium tetramercaptides, titanium tetrabutoxide, titanium tetramethoxides, titanium tetraethoxide, titanium tetrapropoxide, titanium tetrachloride, titanium trichloride, titanium bromides, and combinations of two or more thereof.

Similarly, examples of suitable zirconium compounds include, but are not limited to, zirconium acetate, zirconium formate, zirconium chloride, zirconium bromide, zirconium butoxide, zirconium tert-butoxide, zirconium chloride, zirconium citrate, zirconium ethoxide, zirconium methoxide, zirconium propoxide, and combinations of two or more thereof.

Examples of suitable copper compounds include, but are not limited to, copper nitrate, copper chloride, copper bromide, copper ethoxide, copper fluoride, copper iodide, and combinations of two or more thereof.

Examples of suitable lanthanum compounds include, but are not limited to, lanthanum acetate, lanthanum carbonate, lanthanum octanoate, lanthanum fluoride, lanthanum chloride, lanthanum bromide, lanthanum iodide, lanthanum nitrate, lanthanum perchlorate, lanthanum sulfate, lanthanum titanate, and combinations of two or more thereof.

Examples of the other metal compounds are well known to one skilled in the art, the description of which is omitted herein for the interest of brevity.

For the interest of brevity, a zeolite, calcined zeolite, zeolite-binder, calcined zeolite-binder, or an acid-leached zeolite is referred to herein as a zeolite. According to the present invention, a zeolite can be combined with a metal compound in any suitable weight ratios which would result in the weight ratios of a promoter to a zeolite disclosed in the first embodiment of the invention. Presently, it is preferred that if a ZSM-5 is used, a nickel compound and a molybdenum compound are simultaneously incorporated into the ZSM-5. The combination can be carried out by any means known to one skilled in the art. For example, a metal compound can be physically mixed or blended with a zeolite by stirring, extrusion, blending, kneading, or combinations of two or more thereof. Also for example, a metal compound can be combined with a zeolite by extrusion or impregnation. Presently it is preferred that such combination of zeolite and metal compound be carried out by physical mixing or in a suitable liquid to form an incipient wetness zeolite-metal compound mixture or a modified zeolite. The combinations can be carried out at about 10° C. to about 120° C. for about 1 minute to about 20 hours. The quantity of a metal compound required is the quantity that can produce the composition disclosed in the first embodiment of the invention.

Also preferably, before being incorporated with a nickel compound and a molybdenum compound, a zeolite is contacted with a titanium compound under condition effective to incorporate the titanium compound into the zeolite. The incorporation of a titanium compound into a zeolite can be carried out by the same means disclosed immediately above.

Any liquid that can promote the combination (incorporation or impregnation) of a metal compound and a zeolite can be used. Examples of suitable liquids include, but are not limited to, water, acid, base, hydrocarbon, alcohol, ketone, or combinations of two or more thereof.

The acid can also be a diluted aqueous acid solution. Examples of suitable acids include those disclosed above in the description of acid treatment. The presently preferred acid is citric acid.

Upon completion of incorporating a metal compound into a zeolite, a modified zeolite is formed. The modified zeolite can be calcined, before being heat treated in a reducing atmosphere and in the presence of a hydrocarbon disclosed above. The calcination can be carried out at a temperature, in the range of from about 250° C. to about 1000° C. for about 0.1 to about 20 hours, preferably about 300° C. to about 700° C. for about 0.5 to about 10 hours, and most preferably 350° C. to 650° C. for 1 to 10 hours.

In the next step of the process, the modified zeolite is subject to a heat treatment under a reducing atmosphere, i.e., without oxygen and in the presence of a reducing agent. Heat treatment is also carried out in the presence of a hydrocarbon under a condition sufficient to convert a metal compound to a carburized metal and can include a temperature in the range of from about 200° C. to about 1000° C., preferably about 250° C. to about 750° C., and most preferably 300° C. to 650° C. under a pressure in the range of from about 1 to about 50 atmospheres for a period in the range of from about 0.1 to about 30, preferably about 0.1 to about 20, and most preferably 0.2 to 15 hours.

Heat treatment in the presence of a hydrocarbon, if carried out under a reducing atmosphere, can also be carried out with steam under a suitable condition sufficient to effect the incorporation of carbon into the modified zeolite. The modified zeolite can be air dried to remove most moisture content before being steam-treated. Air drying can be carried out at a temperature for about 25° C. to about 150° C. for about 1 minute to about 30 hours under any effective pressure that can maintain the necessary temperature. The air-dried modified zeolite can then be treated with steam. Generally the steam temperature can be in any suitable vessel and in the range of from about 120° C. to about 1500° C., preferably about 200° C. to about 1200° C., and most preferably 250° C. to 1000° C. The treatment period can be as short as 5 minutes to as long as about 30 hours so long as it is sufficient to convert a metal compound to its sulfide form. The treatment can be carried out under a pressure which can maintain the required temperature and can be in the range of from about atmospheric pressure to about 50 atmospheres.

The presently preferred reducing agent is a hydrogen-containing fluid which comprises molecular hydrogen ($H_2$) in the range of from 1 to about 100, preferably about 5 to about 100, and most preferably 10 to 100 volume %. Other reducing agent can include CO, methane, or combinations thereof. The presently most preferred reducing agent is hydrogen.

Generally any aliphatic hydrocarbon, straight- or branch-chained, can be used for producing a carburized zeolite. Similarly, any aromatic hydrocarbons, non-substituted or substituted, can also be used. However, it is preferred that the hydrocarbon for producing a carburized zeolite has 1 to about 20, preferably about 1 to about 15, and most preferably 1 to 10 carbon atoms per molecule be used for producing a carburized zeolite. Examples of suitable hydrocarbons include, but are not limited to, methane, ethane, propane, butanes, isobutane, pentanes, hexanes, heptanes, octanes, nonenes, benzene, toluene, or combinations of two or more thereof. The presently preferred flow rate of hydrocarbon is about 0.1 to about 10,000, preferably about 1 to 1,000 g of hydrocarbon per g of the modified zeolite. In this step, a carbon-modified zeolite is produced. The flow rate of the reducing agent can be in the same flow rate range of hydrocarbon disclosed herein. The quantity of carbon incorporated can be determined by any means known to one skilled in the art such as, for example, thermal gravimetric analysis.

The composition of the invention then can be, if desired, pretreated with a reducing agent before being used in a hydrocarbon conversion process. The presently preferred reducing agent is a hydrogen-containing fluid which comprises molecular hydrogen ($H_2$) in the range of from 1 to about 100, preferably about 5 to about 100, and most preferably 10 to 100 volume %. The reduction can be carried out at a temperature, in the range of from about 250° C. to about 800° C. for about 0.1 to about 10 hours preferably about 300° C. to about 700° C. for about 0.5 to about 7 hours, and most preferably 350° C. to 650° C. for 1 to 5 hours.

According to the third embodiment of the present invention, a process comprises, consists essentially of, or consists of contacting a hydrocarbon-containing fluid stream with a catalyst composition, optionally in the presence of an inert gas which is preferably a hydrogen-containing fluid, under a condition sufficient to effect the reduction of sulfur content, nitrogen content, or both, or to substantially retain the octane number of the hydrocarbon in the fluid stream. The condition can also include one which increases the octane number of the hydrocarbon in the fluid. The fluid stream comprises a hydrocarbon or hydrocarbon mixture which comprises at least one saturated hydrocarbon, dissolved sulfur or a sulfur compound, and can further comprise paraffins, olefins, naphthas, coker naphthas, naphthenes, fuel oil, or combinations of two or more thereof. The catalyst composition is the same as that disclosed in the first embodiment of the invention which can be prepared by the second embodiment of the invention. The process is also preferably carried out under a condition that can substantially retain the octane number of the hydrocarbon being hydrotreated.

The term "fluid" is used herein to denote gas, liquid, vapor, or combinations thereof. Any fluid which contains a saturated hydrocarbon can be used in the process of this invention. Generally, the fluid stream can also contain olefins, naphthenes (cycloalkanes), or some aromatic compounds. Examples of suitable, available fluid feeds include, but are not limited to, catalytically cracked gasolines, pyrolysis gasolines from thermal cracking of saturated hydrocarbons, coker naphthas produced by the coking of residual charge stocks, naphthas, gas oils, reformates, fuel oils, and combinations of two or more thereof. The origin of the fluid feed is not critical.

The fluid feed stream also comprises sulfur compounds, generally in the range of about 0.0001 weight % (as sulfur) to about as high as 1 weight % or even about 2 weight %, preferably about 0.001 weight % to about 0.5 weight %, and most preferably about 0.005 to about 0.5 weight %. Examples of sulfur compounds include, but are not limited to, hydrogen sulfide, carbon sulfide, carbon disulfide, organic sulfides, organic disulfides, organic trisulfides, organic polysulfides, mercaptans, thiophenes, thiophanes, and combinations of two or more thereof.

The fluid feed stream can also comprise a dissolved nitrogen compound. Examples of nitrogen compounds include amine, hydrazine, pyridine, pyrroline, piperidine, pyrrole, or combinations of two or more thereof. The concentration of nitrogen compound can be in the range of from about 0.00001 to about 0.1 weight % (as nitrogen).

Any hydrogen-containing fluid which comprises, consists essentially of, or consists of, molecular hydrogen ($H_2$) can be used in the process of this invention. This hydrogen-containing fluid can contain $H_2$ in the range of from about 1 to about 100, preferably about 5 to about 100, and most preferably 10 to 100 volume %. If the $H_2$ content in the fluid is less than 100%, the remainder of the fluid may be any inert gas such as, for example, $N_2$, He, Ne, Ar, steam, or combinations of two or more thereof, or any other fluid which does not significantly affect the process or the catalyst composition used herein.

The contacting of a fluid feed stream containing a hydrocarbon with the catalyst composition can be carried out in any technically suitable manner, in a batch or semicontinuous or continuous process, under a condition effective to hydrotreat a hydrocarbon. Generally, a fluid stream as disclosed above, preferably being in the vaporized state, is introduced into a suitable hydroprocessing reactor having a fixed catalyst bed, or a moving catalyst bed, or a fluidized catalyst bed, or combinations of two or more thereof by any means known to one skilled in the art such as, for example, pressure, meter pump, and other similar means. Because a hydrocarbon conversion reactor and process therewith are well known to one skilled in the art, the description of which is omitted herein for the interest of brevity. The conditions of the process of the invention can include a weight hourly space velocity of the fluid feed stream in the range of about 0.01 to about 100, preferably about 0.05 to about 50, and most preferably 0.1 to 30 g feed/g catalyst/hour. The hydrogen-containing fluid (gas) hourly space velocity generally is in the range of about 1 to about 10,000, preferably about 5 to about 7,000, and most preferably 10 to 10,000 ft³ $H_2$/ft³ catalyst/hour. Generally, the pressure can be in the range of from about 0 to about 2000 psig, preferably about 0 to about 1000 psig, and most preferably 0 to 750 psig, and the temperature is about 150 to about 1500° C., preferably about 200 to about 1000° C., and most preferably 250 to 1000° C.

The process effluent generally has reduced sulfur content, reduced nitrogen content, or both, or has substantially the same octane number as the hydrocarbon in the feed stream. The process effluent can be recovered and processed by any means known to one skilled in the art.

After the catalyst composition has been deactivated by, for example, coke deposition or feed poisons, to an extent that the sulfur reduction, or nitrogen reduction, or octane number retention has become unsatisfactory, the catalyst composition can be reactivated by any means known to one skilled in the art such as, for example, calcining in air to burn off deposited coke and other carbonaceous materials, such as oligomers or polymers, preferably at a temperature of about 400 to about 1000° C. The optimal time periods of the calcining depend generally on the types and amounts of deactivating deposits on the catalyst composition and on the calcination temperatures. These optimal time periods can easily be determined by those possessing ordinary skills in the art and are omitted herein for the interest of brevity.

The following examples are presented to further illustrate this invention and are not to be construed as unduly limiting the scope of the present invention.

EXAMPLE I

This example illustrates the preparation of several catalysts comprising ZSM-5 zeolite.

A ZSM-5 zeolite having a product designation of T-4480 was obtained from UCI (United Catalyst Inc., Louisville, Ky.) as powder. The zeolite (10 g) was mixed with 10 g of alumina and 20 g of 20 weight % ammonium heptamolybdate (($NH_4$)$_6Mo_7O_{24}$·$4H_2O$) under incipient wetness conditions to impregnate ammonium heptamolybdate onto the zeolite. Thereafter, the resulting alumina-bound ammonium heptamolybdate-impregnated zeolite was extruded to ¹⁄₁₆ inch extrudates which were then air calcined at 538° C. for 6 hours to produce 19.45 g of Mo-modified zeolite (catalyst A) containing 11.176 weight % molybdenum.

A portion (17.33 g) of the Mo-modified zeolite was further heated in a gas mixture of methane (flow rate=150 ml/min) and hydrogen (600 ml/min) for 2 hours at 750° C. to produce 16.32 g of catalyst B (ZSM-5 promoted with carburized molybdenum) also containing 11.176 weight % molybdenum.

An alumina-bound ZSM-5 was also obtained from UCI as ¹⁄₁₆ inch extrudates. After being calcined for 3 hours at 538° C., 19.95 g of the alumina-bound ZSM-5 was impregnated with 14.43 grams of an aqueous solution containing 20 weight % ($NH_4$)$_6Mo_7O_{24}$·$4H_2O$ and 16 weight % $Ni(NO_3)_2$·$6H_2O$ (Mo/Ni impregnation solution). The solution was prepared by dissolving 10 g of ammonium heptamolybdate and 8 g of nickel nitrate in 32 g of water. The resulting ammonium molybdate- and nickel nitrate-impregnated material was calcined in air at 538° C. for 6 hours to produce 22.19 g of catalyst C (Ni/Mo-promoted ZSM-5). Catalyst C contained 7.068 weight % Mo and 2.100 weight % Ni.

A portion of catalyst C (18.86 g) was heated in a gas mixture of methane (flow rate: 600 ml/minute) and hydrogen (flow rate: 150 ml/minute) at 750° C. for 2 hours to produce 18.20 g of catalyst D (carburized Ni/Mo-promoted ZSM-5).

In a separate run, the alumina-bound ZSM-5 (T-4480) was similarly calcined as disclosed above for producing catalyst C. A portion (64.97 g) of the calcined zeolite was suspended in 130 g of 6N HCl solution and subsequently heated at 90° C. for 2 hours followed by calcination at 538° C. for 6 hours to produce 51.10 g of acid-leached zeolite. A portion (16.02 g) of the acid-leached zeolite was subsequently impregnated with 16.15 g of the Mo/Ni impregnation solution (as disclosed above) followed by air calcination of the resulting impregnated product at 538° C. for 6 hours to produce 18.95 g of Mo/Ni-promoted ZSM-5 (catalyst EE) which contained 9.262 weight % Mo and 2.752 weight % Ni. Catalyst EE (16.07 g) was further heated in a gas mixture of methane (150 ml/minute) and hydrogen (600 ml/minute) for 2 hours at 750° C. to produce 15.45 g of carburized Mo/Ni-promoted ZSM-5 (catalyst E).

Another portion (19.41 g) of similarly calcined alumina-bound ZSM-5 zeolite was treated with 25 weight % TYZOR®TE (ethanol, 2,2', 2"-nitrilotris-, titanium (4+) salt; obtained from duPont, Wilmington, Del.) in water to produce titanium-modified zeolite which was calcined at 385° C. for 3 hours to produce 20.09 g of calcined titanium-modified zeolite (catalyst FF).

Catalyst FF was impregnated with 13.28 g of the Mo/Ni impregnation solution followed by air calcination at 538° C. for 6 hours to produce 22.57 g of Ti/Mo-promoted zeolite (catalyst F) containing 3.385 weight % $TiO_2$, 6.395 weight % Mo, and 1.900 weight % Ni. The Ti/Mo/Ni-promoted zeolite (19.10 g) was further treated with a gas mixture of methane (150 ml/minute) and hydrogen (600 ml/minute) at 750° C. for 2 hours to produce 18.55 g of carburized Ti/Mo/Ni-promoted zeolite (catalyst G).

EXAMPLE II

This example illustrates the use the catalysts in Example I in a hydrotreating process.

In a coker naphtha conversion process, a stainless steel reactor tube (inner diameter: 2.5 cm; length: 60 cm) was filled with a 20 ml bottom layer of Alundum® alumina (inert, low surface alumina, Norton Company, Worcester, Mass.), 3.3 to 3.5 grams (5 ml) of one of the catalysts produced in Example I in the middle, and a 20 ml top layer of Alundum® alumina. The reactor was heated to a reaction temperature of about 368° C. to about 370° C. The feed was a coker naphtha having an average density of 0.695 and average molecular weight 95.104, obtained from a Phillips Petroleum Company refinery. The feed was introduced at a rate of about 20 ml/hour, together with hydrogen gas at a rate of 260 ml/min. The molar ratio of hydrogen to naphtha was 4.796. The reaction pressure was about 500 psig.

The reactor effluent was cooled and separated into a gaseous phase and a liquid phase by passing it through a wet ice trap for liquid product collection and then through a wet test meter for gas volume measurement. The liquid was weighed hourly and analyzed on a Hewlett-Packard 5890 gas chromatograph equipped with a fused silica column (DB-1). The gas was sampled hourly and analyzed on a Hewlett-Packard 5890 gas chromatograph using a HP-PLOT/$Al_2O_3$ column. The gas was also analyzed for hydrogen content on a Carle gas chromatograph using a hydrocarbon trap followed by a 13× molecular sieve column. Pertinent test results after run times of about 6 hours are summarized in Table I.

In Table I below, $C_5+$ yield denotes total hydrocarbon molecules having 5 or more carbon atoms; S and N refer to parts per million by weight of sulfur and nitrogen, respectively; Bz is benzene; and RON refers to research octane number. The sulfur and nitrogen contents of the feed, coker naphtha, are given at the bottom of Table I.

TABLE I

| Catalyst | $C_5+$ yield (wt %) | S (ppmw) | N (ppmw) | Olefins (wt %) | Bz (wt %) | RON |
|---|---|---|---|---|---|---|
| A | 63.7 | 1977 | 58.0 | 6.13 | 0.23 | 66.20 |
| B | 68.3 | 732 | 10.0 | 3.72 | 0.17 | 62.64 |
| C | 28.2 | 240 | 7.0 | 2.23 | 0.71 | 80.29 |
| D | 64.7 | 193 | 1.0 | 2.30 | 0.39 | 73.16 |
| E | 67.9 | 154 | 1.0 | 3.82 | 0.32 | 72.2 |
| F | 25.8 | 925 | 13.0 | 4.10 | 0.53 | 76.0 |
| G | 74.8 | 100 | 1.0 | 1.39 | 0.42 | 74.7 |
| Coker Naphtha | | 9300 | 93.8 | 29.41 | 0.23 | 72.56 |

Test data in Table I clearly show the advantages of the carburized Mo/Ni-promoted ZSM-5 catalysts of this invention (catalysts D, E, and G) over a Mo/Ni-ZSM-5 (catalyst C) in which Mo and Ni were not carburized with a hydrocarbon: lower undesirable sulfur and nitrogen contents; higher desirable products, $C_5+$ hydrocarbons; and substantially unchanged octane number.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

What is claimed is:

1. A process consisting essentially of (1) contemporaneously contacting a zeolite with two metal compounds selected from the group consisting of titanium compounds, zirconium compounds, zinc compounds, silver compounds, copper compounds, molybdenum compounds, lanthanum compounds, tungsten compounds, chromium compounds, iron compounds, ruthenium compounds, manganese compounds, rhenium compounds, cobalt compounds, rhodium compounds, iridium compounds, nickel compounds, palladium compounds, platinum compounds, and hafnium compounds thereby incorporating said two metal compounds into said zeolite to form a modified zeolite and (2) contacting said modified zeolite with a methane-containing hydrocarbon in a reducing atmosphere thereby forming a carburized metal-promoted zeolite.

2. A process according to claim 1 wherein modified zeolite produced in step (1) is calcined before the step (2) contacting.

3. A process according to claim 1 wherein said metal compounds are selected from nickel compounds and, molybdenum compounds.

4. A process according to claim 1 wherein said contacting in step (1) is carried out in citric acid.

5. A process according to claim 4 wherein the contacting in step (2) is carried out in the presence of a hydrogen-containing fluid.

6. A process according to claim 4 wherein said metal compounds are selected from molybdenum compounds and nickel compounds.

7. A process according to claim 6 wherein said zeolite is ZSM-5.

8. A process according to claim 6 wherein the zeolite is contacted with a titanium compound prior to step (1).

9. A process according to claim 8 wherein the contacting in step (2) is carried out in the presence of hydrogen-containing fluid.

10. A process according to claim 9 wherein said metal compounds comprise ammonium heptamolybdate and nickel nitrate.

11. A process according to claim 6 wherein the contacting in step (2) is carried out in the presence of hydrogen-containing fluid.

12. A process according to claim 11 wherein said hydrocarbon is methane.

13. A process according to claim 1 wherein the contacting in step (2) is carried out in the presence of a hydrogen-containing fluid.

14. A process according to claim 1 wherein said hydrocarbon is selected from the group consisting of aliphatic hydrocarbons, aromatic hydrocarbons, and combinations thereof.

15. A process consisting essentially of (1) contacting a ZSM-5 zeolite with a molybdenum compound contemporaneously with a nickel compound to produce a modified zeolite; (2) calcining said modified zeolite to produce a calcined modified zeolite; and (3) contacting said calcined modified zeolite with a hydrocarbon in a reducing atmosphere wherein said hydrocarbon is selected from the group consisting of methane, ethane, propane, butanes, isobutane, pentanes, hexanes, heptanes, octanes, nonenes, benzene, toluene, and combinations of two or more thereof.

16. A process according to claim 15 wherein the contacting in step (3) is carried out in the presence of hydrogen-containing fluid.

17. A process according to claim 15 wherein said process further comprises contacting said ZSM-5 zeolite with an acid before step (1).

18. A process according to claim 17 wherein said acid is selected from the group consisting of citric acid, oxalic acid, propionic acid, succinic acid, malic acid, sulfuric acid, hydrochloric acid, nitric acid, phosphoric acid, formic acid, acetic acid, trifluoroacetic acid, trichloroacetic acid, p-toluenesulfonic acid, methanesulfonic acid, partially or fully neutralized acids wherein one or more protons have been replaced with a metal or ammonium ion, and combinations of two or more thereof.

19. A process according to claim 18 wherein said acid is hydrochloric acid.

20. A process according to claim 19 wherein the contacting in step (3) is carried out in the presence of a hydrogen-containing fluid.

21. A process according to claim 20 wherein said hydrocarbon is methane.

22. A process according to claim 15 wherein said process further comprises contacting said ZSM-5 zeolite with a titanium compound before step (1) contacting.

23. A process according to claim 22 wherein the contacting in step (3) is carried out in the presence of a hydrogen-containing fluid.

24. A process according to claim 23 wherein said hydrocarbon is methane.

25. A process consisting essentially of (1) contacting a zeolite with a molybdenum compound and, contemporaneously, with a nickel compound to produce a modified zeolite; (2) calcining said modified zeolite to produce a calcined modified zeolite; and (3) contacting said calcined modified zeolite with methane in the presence of hydrogen wherein said contacting in step (1) is carried out in an acid.

26. A process according to claim 25 wherein said acid is citric acid.

27. A process according to claim 26 wherein said process further comprises contacting said ZSM-5 with hydrochloric acid before the step (1) contacting.

28. A process according to claim 26 wherein said process further comprises contacting said ZSM-5 with a titanium compound before the step (1) contacting.

* * * * *